(12) United States Patent
Aben et al.

(10) Patent No.: US 6,208,389 B1
(45) Date of Patent: *Mar. 27, 2001

(54) DISPLAY DEVICE COMPRISING A DISPLAY SCREEN HAVING AN ANTISTATIC AND LIGHT-ABSORBING COATING

(75) Inventors: Gerardus V. A. Aben; Leo H. M. Krings, both of Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/325,015

(22) Filed: Oct. 19, 1994

(30) Foreign Application Priority Data

Oct. 18, 1993 (NL) .................................... 09301103

(51) Int. Cl.⁷ ................ H04N 5/65; H04N 1/00; H01J 31/00
(52) U.S. Cl. ............... 348/824; 345/60; 313/479; 358/305
(58) Field of Search .................. 313/478, 479, 313/461; 252/502, 506; 358/305; 345/37, 41, 60, 85; 348/338, 797, 823, 824, 826, 842, 844

(56) References Cited

U.S. PATENT DOCUMENTS

| 4,775,412 | 10/1988 | Nishikura et al. | 75/95 A |
|---|---|---|---|
| 4,959,162 | 9/1990 | Armes et al. | 252/519 |
| 5,412,279 | * 5/1995 | De Boer | 313/479 |
| 5,476,612 | * 12/1995 | Wessling et al. | 252/511 |

FOREIGN PATENT DOCUMENTS

| 0533256 | 3/1993 | (EP) . | |
|---|---|---|---|
| 0553256 | 3/1993 | (EP) | H01J/29/86 |
| 0585819 | 3/1994 | (EP) . | |
| 63-232466 | * 10/1987 | (JP) . | |
| 5117552 | * 5/1993 | (JP) . | |

* cited by examiner

*Primary Examiner*—Madeleine Nguyen
(74) *Attorney, Agent, or Firm*—Norman N. Spain

(57) ABSTRACT

The display screen 3 of a cathode ray tube 1 is provided with an antistatic, light-absorbing coating 8 which consists of ATO (Sb:SnO$_2$) particles and polypyrrole particles. The coating may be provided with additional layers of silicon dioxide to obtain an antireflective and antiglare effect.

9 Claims, 1 Drawing Sheet

Figure 1:
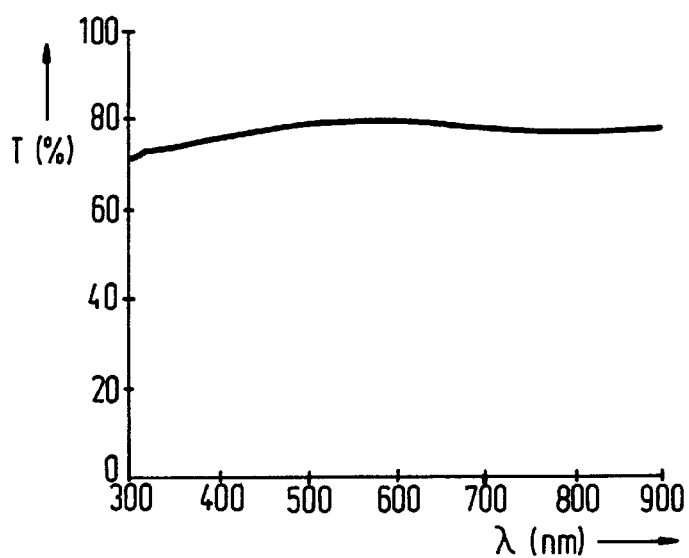

DISPLAY DEVICE COMPRISING A DISPLAY SCREEN HAVING AN ANTISTATIC AND LIGHT-ABSORBING COATING

BACKGROUND OF THE INVENTION

1. Field of the Invention

The invention relates to a display device, in particular a cathode ray tube, comprising a display screen having an antistatic, light-absorbing coating which contains latex particles of electroconductive polypyrrole.

The invention also relates to a method of manufacturing an antistatic, light-absorbing coating on a display screen.

2. Description of the Related Art

Antistatic coatings are used on display screens of display devices, in particular cathode ray tubes (CRTs). Such coatings are sufficiently electroconductive to ensure that a high electrostatic voltage present on the outside surface of the display screen is removed within a few seconds. Thus, the user does not experience an unpleasant shock if he touches the screen. Besides, the attraction of atmospheric dust is reduced.

Light-absorbing layers which reduce the light transmission are used on display screens of display devices, for example cathode ray tubes and liquid crystal display devices (LCD and LC-TV), to improve the contrast of the image reproduced. By virtue thereof, the necessity of changing the glass composition of the display screen is avoided and the possibilities of bringing the light transmission to a desired value in a simple manner are increased. Such filtering layers reduce the transmission of incident ambient light as well as light originating from the internal light source, for example the CRT phosphors. The incident ambient light passes through the light-absorbing coating and the glass display screen, subsequently, reflects off the rough phosphor layer on the inside of the display screen and again passes through the display screen and the light-absorbing coating. If the transmission of the light-absorbing coating amounts to T, then the intensity of the reflected ambient light is reduced by a factor of $T^2$. Light originating from the CRT phosphors passes only once through the light-absorbing coating, so that the intensity of this light is reduced only by a factor of T. The combination of these effects causes an increase of the contrast by a factor of T.

In published European Patent Application EP-A-533256, assigned to the present assignee, a description is given of the manufacture of an antistatic, light-absorbing coating which comprises a layer of a matrix of silicon dioxide and latex particles consisting of an electroconductive polypyrrole compound. In the known method, an aqueous dispersion of polypyrrole latex particles is added to an aqueous solution of a hydrolysed alkoxy silane compound, whereafter the dispersion is provided on the display screen and the hydrolysed alkoxy silane compound, for example tetraethyl orthosilicate, is converted to silicon dioxide by means of a treatment at temperatures between 150° C. and 170° C. for at least 30 minutes. The polypyrrole dispersion is prepared in the presence of an excess of water-soluble polymer as the steric stabilizer, for example polyvinyl alcohol. Since conductive polypyrrole is black, the coating obtained also has light-absorbing properties and a neutral grey exterior.

Since polypyrrole is an electroconductive material, a coating on the basis of a polypyrrole dispersion would result in an electroconductive layer. The presence of an excess of a steric stabilizer, however, prevents the layer from being electroconductive. In the known method, the coating is rendered electroconductive (antistatic) by removing the excess stabilizer by a centrifuging treatment for 1 hour at 11000 r.p.m., whereafter the polypyrrole particles are again dispersed in water. This method is time consuming due to the additional process steps.

If desired, the known coating can be supplemented with layers having an antireflective or antiglare effect or with layers which improve the scratch resistance. These additional layers are usually provided by spinning or spraying of an alcoholic alkoxy silane compound. Therefore, it is often necessary to subject the first coating formed from the aqueous mixture of the polypyrrole dispersion and the alkoxy silane compound to a thermal drying treatment to preclude that this layer is washed away when the additional layer is provided.

SUMMARY AND DESCRIPTION OF THE INVENTION

It is an object of the invention to provide, inter alia, a display device comprising a display screen having an antistatic, light-absorbing coating which adheres firmly to the glass display screen, is homogeneous and has satisfactory optical properties. The layer must have a simple composition and also be suitable to bring the light transmission to the desired value. It must also be possible to combine the layer with additional layers in order to obtain an antireflective and antiglare effect. The invention also aims at providing a simple method of manufacturing such coatings, which method must be practicable, in particular, at relatively low temperatures at which no damage is done to components of a cathode ray tube. In addition, the method must be suitable for optionally providing additional layers without a previous temperature treatment of the antistatic and light-absorbing coating.

These objects are achieved by a display device, in particular a cathode ray tube, as described in the opening paragraph, which display device is characterized in accordance with the invention in that the coating consists predominantly of a mixture of latex particles of polypyrrole and antimony-doped tin oxide particles.

For the polypyrrole compound use can be made of polypyrrole, N-substituted polypyrrole and β-substituted polypyrrole. For the substituents use can be made of: alkyl groups having, for example, up to 5 carbon atoms, aryl groups, alkoxy groups, nitro groups and halogen atoms. Such materials and the preparation of latex particles, inter alia, for use as an antistatic coating, are described in U.S. Pat. No. 4,959,162. Also this American patent describes a centrifuging step and a re-dispersion step to purify the latex which has been prepared. Preferably, the latex particles consist of unsubstituted polypyrrole.

In view of the optical properties and the uniformity and homogeneity of the layer, it is desirable for the latex particles of polypyrrole to have uniform dimensions. The latex particles are spherical and the average diameter preferably ranges between 30 and 80 nm.

In addition to polypyrrole particles, the coating in accordance with the invention comprises particles of antimony-doped tin oxide (ATO or $Sb:SnO_2$). The ATO particles used are very small, their dimensions preferably being smaller than 30 nm. By virtue of such small dimensions of both the polypyrrole particles and the ATO particles no visible light scattering occurs and the coating formed is transparent. The particles are sufficiently electroconductive if the molar ratio Sb/Sn is less than 0.3. By virtue of the small dimensions of the ATO particles, Van der Waals' forces occur which cause a sufficiently firm adhesion of the ATO particles to a glass substrate. The ATO particles are provided on the display screen from an aqueous, stable ATO suspension (hydro-sol) which also comprises the polypyrrole particles. In the suspension, the ATO particles are not sterically stabilized but charge stabilized. Such a suspension enables very thin conductive layers having a surface resistance of approximately 1 MΩ/square to be manufactured. The preparation of such an ATO suspension, inter alia, for use as an antistatic coating is described in U.S. Pat. No. 4,775,412.

The coating in accordance with the invention does not comprise a matrix of $SiO_2$. The layer is built up of only two essential components, namely ATO particles and polypyrrole particles, the ATO particles providing the antistatic properties and the polypyrrole particles providing the light-absorbing properties of the layer. Both properties are combined in a single layer. As a result of the method described below, the coating consists of a homogeneous mixture of both types of particles. The layer thickness of the coating ranges between 50 and 400 nm. The colour of the coating is neutral grey, i.e. the transmission is independent of the wavelength. Dependent upon the layer thickness and the concentration of polypyrrole in the layer, the transmission can be adjusted between, for example, 90% and 30%, without adversely affecting the necessary antistatic effect. A sufficient antistatic effect of the coating is attained if the surface resistance of the layer is less than $10^{10}$ Ω/square.

The coating is preferably supplemented with layers of silicon dioxide having an antireflective or antiglare effect with the additional layers also increasing the scratch resistance. Antireflective layers are used on display screens to suppress disturbing reflections (specular reflections). Antiglare layers are used to convert the specular reflection of ambient light into diffuse reflection.

The refractive index of the coating of ATO and polypyrrole particles is higher than the refractive index of the additional silicon dioxide layer. The respective layer thicknesses of a two-layer coating can be selected to be such that destructive interference occurs at a central wavelength $\lambda$ of, for example, approximately 550 nm. At this wavelength the stack of layers has an antireflective effect. It is known to those skilled in the art that the optical thicknesses n.t (wherein n is the refractive index and t is the layer thickness) of the layers must be equal to $\lambda/4$, wherein $\lambda$ is the central wavelength. Such an additional layer of silicon dioxide can be manufactured by providing an aqueous or alcoholic solution of an alkoxy silane compound, followed by a treatment at an increased temperature thereby forming a layer of silicon dioxide. If the additional layer is provided by spinning, the layer thickness obtained depends, inter alia, on the rotational speed and the viscosity of the solution.

Preferably, a second additional layer of silicon dioxide having an antiglare effect is provided. Such layer is provided by spraying an aqueous or alcoholic solution of an alkoxy silane compound onto the first additional layer, whereafter a treatment at an increased temperature is carried out, thereby forming a layer of silicon dioxide. The layer obtained is scratch resistant and has antiglare properties owing to the surface texture formed by spraying. The antiglare effect is substantially independent of the wavelength of the light.

If necessary, one of the additional layers can be provided with a pigment or dye in order to selectively influence the light transmission. Such pigments or dyes are selected in such a manner that the light emitted by the phosphors of a cathode ray tube is selectively transmitted, whereas, for example, the ambient light which reflects at the rear side of the display screen is absorbed. Examples of pigments are transition metal oxides, such as iron oxide and chromium oxide. Rhodamine B is an example of a suitable dye.

The object of providing a simple method of manufacturing an antistatic and light-absorbing coating on a display screen is achieved in accordance with the invention in that an aqueous suspension of latex particles of a polypyrrole compound is mixed with an aqueous suspension of antimony-doped tin oxide particles, whereafter a layer of the mixture obtained is spun onto the display screen and dried, thereby forming the coating. The preparation and properties of the polypyrrole suspension and ATO suspension are the same as described hereinabove.

The use of aqueous suspensions has the advantage that they are less harmful to the environment. Another advantage of aqueous suspensions is that the adhesion of the ATO particles and polypyrrole particles to the display screen is sufficient to dispense with a temperature treatment after the layer has dried, so that an optional, additional layer can be provided directly from a solution of an alkoxy silane compound. In the case of the known layer which is obtained from a solution of an alkoxy silane compound and polypyrrole particles, the layer must first be cured at an increased temperature of 160° C., thereby forming a silicon dioxide matrix.

A further advantage of the method in accordance with the invention is that the centrifuging treatment for removing the excess steric stabilizer can be dispensed with.

A preferred embodiment of the method in accordance with the invention is characterized in that a layer of a solution of an alkoxy silane compound is spun onto the coating, whereafter the alkoxy silane compound is converted into an additional layer of silicon dioxide by means of a treatment at an increased temperature, the coating and the additional layer together producing an antireflective effect. The layer of the alkoxy silane solution can be provided as soon as the coating of ATO particles and polypyrrole particles has dried. The solvent used for the alkoxy silane compound is water or an alcohol.

The conversion into silicon dioxide takes place, for example, by means of a treatment at a temperature between 150° C. and 170° C. for at least 30 minutes. The alkoxy groups of the alkoxy silane compound are converted into hydroxy groups by acidified water with the hydroxy groups reacting with each other and with hydroxy groups of the glass surface of the display screen. During drying and heating, a firmly adhering network of silicon dioxide is formed by polycondensation.

A homogeneous, smooth layer is formed by spin coating of the alkoxy silane solution. Optionally, a surface-active substance is added to the solution, for example in quantities of from 0.001 to 5 wt. %.

As mentioned hereinabove, the combination of the coating and the additional layer of silicon dioxide exhibit an antireflective effect if the optical layer thicknesses of the layers are equal to $\lambda/4$. The desired layer thicknesses can be experimentally established. Important process parameters which determine the layer thickness are the rotation speed during spinning, temperature, concentration and viscosity of the solution.

A further embodiment of the method in accordance with the invention is characterized in that a layer of a solution of an alkoxy silane compound is sprayed onto the additional layer of silicon dioxide, whereafter the alkoxy silane compound is converted into a further additional layer of silicon dioxide by subjecting it to a treatment at an increased temperature with the further additional layer producing an antiglare effect. A mat surface texture is obtained by spraying or atomizing of the alkoxy silane solution, as a result of which the layer obtained has an antiglare effect. Consequently, ambient light is diffusely reflected.

Further advantages of the additional layers of silicon dioxide are the reduced sensitivity to fingerprints and the higher hardness and scratch resistance.

An alkoxy-silane compound which can suitably be used in the methods in accordance with the invention is tetraethyl orthosilicate (TEOS). Other known alkoxy silane compounds of the type $Si(OR)_4$ and oligomers thereof can be used, wherein R is an alkyl group, preferably a $C_1$–$C_5$ alkyl group. For the solvent use is made of, for example, water or an alcohol, such as methanol, ethanol, propanol and butanol.

BRIEF DESCRIPTION OF THE DRAWING FIGURES

Figure 2:
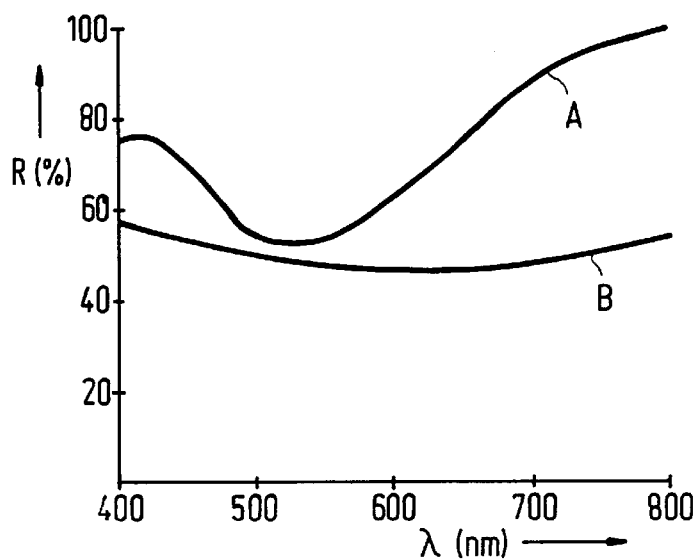
Figure 3:
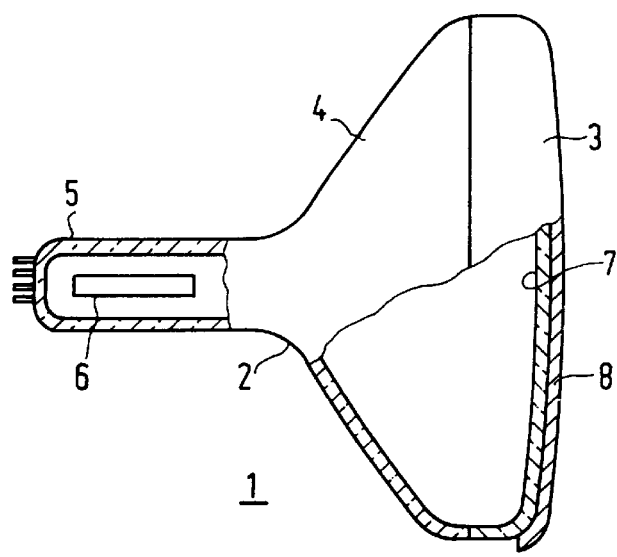

The invention will be explained in greater detail by means of exemplary embodiments and a drawing, in which FIG. 1 represents the transmission T (in %) as a function of the wavelength λ (in nm) of a coating in accordance with the invention, FIG. 2 represents the relative reflection R (in %) as a function of the wavelength λ (in nm) of a coating which consists of ATO particles and polypyrrole particles on which an additional layer of silicon dioxide is provided (curve A), and on which a second additional antiglare layer of silicon dioxide is provided (curve B), and FIG. 3 is a partly cut-away view of an embodiment of a cathode ray tube in accordance with the invention.

DESCRIPTION OF THE PREFERRED EMBODIMENTS

Exemplary Embodiment 1

Polypyrrole latex particles are prepared by vigorously stirring a mixture of 0.938 g pyrrole, 8.65 g $FeCl_3.6H_2O$ and 1 g polyvinyl alcohol (steric stabilizer) in 100 ml water for at least 10 hours. The formation of polypyrrole particles can be recognized by the blackening of the mixture. The suspension obtained is dialysed with demineralised water to remove $Fe^{2+}$ and $Cl^-$ ions. After dialysis, a few milliliters ethanol, butanol and ethyl acetate are added to the suspension. Finally, the suspension is passed through a 5 μm and 0.2 μm filter of polyamide. Electron microscopy shows that the latex particles have a regular spherical shape and that they are monodisperse with an average particle size of 60 nm.

The preparation of an ATO suspension is, for example, described in U.S. Pat. No. 4,775,412. According to this document, $SnCl_2$ and $SbCl_3$ are dissolved in diluted hydrochloric acid, whereafter ammonium bicarbonate is added to the solution. In an autoclave, a hydrosol of tin oxide doped with antimony is formed by hydrothermal conversion. The ATO particles are smaller than 30 nm. In a typical example, the molar ratio Sb/Sn is 0.3. The aqueous ATO suspension amounts to 5 wt. %.

Equal quantities of both suspensions are mixed, thereby forming a stable suspension of ATO particles and polypyrrole particles. This suspension is subsequently provided on a display screen by means of spin coating. After drying, a homogeneous, neutral grey coating having a layer thickness of 100 nm and a resistance of 1 MΩ/square is obtained. This is amply sufficient for the desired antistatic effect (surface resistance below $10^{10}$ Ω/square is desirable) and makes it possible to bring the light transmission properties to the desired values by changing the layer thickness and the concentration of the polypyrrole, while preserving the required antistatic effect. The transmission T (in %) as a function of the wavelength λ (in nm) of the coating obtained is shown in FIG. 1. The resistance value of the coating in accordance with the invention is much lower than the values obtained when use is made of layers of silicon dioxide in which ATO particles or polypyrrole particles with a steric stabilizer are dispersed.

Exemplary Embodiment 2

A solution of an alkoxy silane compound is prepared having the following composition: 0.9 mol tetraethyl orthosilicate (TEOS), 3.6 mol water, $5.10^{-4}$ mol nitric acid, which is made up to 1 liter by adding ethanol.

A layer of the TEOS solution is spun onto the coating obtained in accordance with exemplary embodiment 1. The layer is maintained at a temperature of 160° C. for 30 minutes, resulting in the formation of a firmly adhering, smooth layer of silicon dioxide. This additional layer of silicon dioxide has a layer thickness of 135 nm and a refractive index of 1.44. This layer in combination with the coating of ATO and polypyrrole particles having an effective refractive index of 1.62 and an optical layer thickness of 60 nm, has an antireflective effect.

Subsequently, the same TEOS solution and a similar temperature treatment are used to provide a second additional layer of silicon dioxide by means of spraying. This layer has a mat surface texture having an antiglare effect. By virtue thereof, the coating obtained is less sensitive to fingerprints. In addition, the reflection is less governed by the wavelength because the incident light is diffusely scattered.

FIG. 2 represents the relative reflection R (in %) as a function of the wavelength λ (in nm) of a coating which consists of the above-described coating of ATO and polypyrrole particles on which the additional layer of silicon dioxide (curve A) is provided. The reference material used in the measuring process is uncoated display screen glass. Curve B shows the effect of the additional antiglare layer. The antireflective effect of the coating has become less dependent on the wavelength.

The scratch resistance of the outermost layer is tested by means of a conical diamond which is moved over the surface at a force of 50 g and which does not form scratches that are visible to the naked eye.

The hardness is tested by means of a pencil-hardness test in which pencils of different hardness exert a force of 7.5 N on the surface of the layer over which they are moved at an angle of 45° and a velocity of 0.05 m/s. According to this test, the inventive layer has a degree of hardness of from 5 H to 6 H.

Exemplary Embodiment 3

FIG. 3 diagrammatically shows a cut-away view of a cathode ray tube 1 which is known per se and which comprises a glass envelope 2 having a display screen 3, a cone 4 and a neck 5. In the neck there is provided an electron gun 6 for generating an electron beam. The electron beam is focused on a phosphor layer on the inside 7 of the display screen 3. The electron beam is deflected across the display screen 3 in two mutually perpendicular directions by means of a deflection coil system. The display screen 3 is provided on the outside with an antistatic, light-absorbing coating 8 in accordance with the invention.

By means of the invention, effective antistatic and light-absorbing coatings are manufactured and provided on a display screen of a cathode ray tube in a simple manner with the coatings enabling the light transmission properties to be adjusted, whether or not as a function of the wavelength of the light.

What is claimed is:

1. A display device comprising a display screen having an antistatic, light-absorbing coating which contains latex particles of electroconductive polypyrrole characterized in that the coating predominately consists of a homogeneous mixture of said latex particles of polypyrrole, a steric stabilizer for said particles of polypyrrole in an excess amount and antimony-doped tin oxide particles.

2. A display device as claimed in claim 1, characterized in that the doped tin oxide particles are smaller than 30 nm.

3. A display device as claimed in claim 1, characterized in that the particles of polypyrrole have an average diameter in the range between 30 and 80 nm.

4. A display device as claimed in claim 1, characterized in that the coating has a thickness in the range between 50 and 400 nm.

5. A display device as claimed in claim 1, characterized in that the coating is covered with an additional layer of silicon dioxide, the coating and the additional layer having a thickness such that the layers together exhibit an antireflective effect.

6. A display device as claimed in claim 5, characterized in that the additional layer of silicon dioxide is covered with a further additional layer of silicon dioxide, said further additional layer having a surface texture exhibiting an antiglare effect.

7. A method of manufacturing an antistatic, light-absorbing coating on a display screen of a display device, characterized in that an aqueous suspension of latex particles of a polypyrolle compound comprising a steric stabilizer therefore in an excess amount is mixed with an aqueous suspension of antimony-doped tin oxide particles, whereafter a layer of the mixture thus obtained is spun onto the display screen and subsequently dried, thereby forming the coating.

8. A method as claimed in claim 7, characterized in that a layer of a solution of an alkoxy silane compound is spun onto the coating, whereafter the alkoxy silane compound is converted into an additional layer of silicon dioxide by means of a treatment at an increased temperature, the coating and the additional layer together producing an antireflective effect.

9. A method as claimed in claim 8, characterized in that a layer of a solution of an alkoxy silane compound is sprayed onto the additional layer of silicon dioxide, whereafter the alkoxy silane compound is converted into a further additional layer of silicon dioxide by subjecting it to a treatment at an increased temperature, said further additional layer producing an antiglare effect.

* * * * *